US011409296B1

(12) United States Patent
Kim et al.

(10) Patent No.: US 11,409,296 B1
(45) Date of Patent: Aug. 9, 2022

(54) SYSTEM FOR AUTONOMOUS MOBILE DEVICE NAVIGATION IN DYNAMIC PHYSICAL SPACE

(71) Applicant: AMAZON TECHNOLOGIES, INC., Seattle, WA (US)

(72) Inventors: Chang Young Kim, Newark, CA (US); Roger Robert Webster, Los Altos, CA (US)

(73) Assignee: AMAZON TECHNOLOGIES, INC., Seattle, WA (US)

(*) Notice: Subject to any disclaimer, the term of this patent is extended or adjusted under 35 U.S.C. 154(b) by 374 days.

(21) Appl. No.: 16/573,845

(22) Filed: Sep. 17, 2019

(51) Int. Cl.
  *G05D 1/02* (2020.01)
  *G05D 1/00* (2006.01)
  *G06V 20/10* (2022.01)

(52) U.S. Cl.
  CPC ......... *G05D 1/0214* (2013.01); *G05D 1/0088* (2013.01); *G05D 1/0246* (2013.01); *G05D 1/0274* (2013.01); *G06V 20/10* (2022.01)

(58) Field of Classification Search
  CPC .. G05D 1/0214; G05D 1/0088; G05D 1/0246; G05D 1/0274; G06K 9/00664
  See application file for complete search history.

(56) References Cited

U.S. PATENT DOCUMENTS

| | | | |
|---|---|---|---|
| 2015/0266475 A1* | 9/2015 | Tanzmeister | B60W 30/0956 701/301 |
| 2020/0225673 A1* | 7/2020 | Ebrahimi Afrouzi | G05D 1/0214 |

OTHER PUBLICATIONS

WHATIS.com: "What is Footprint", Apr. 2005.*

* cited by examiner

*Primary Examiner* — Rodney A Butler
(74) *Attorney, Agent, or Firm* — Lindauer Law, PLLC

(57) ABSTRACT

An autonomous mobile device (AMD) moves through a physical space without human intervention. Data from sensors on the AMD is used to determine an occupancy map indicative of obstacles and their locations in the physical space. Obstacles may be static, variable, or dynamic. For example, walls are static, doors which open and close are variable, and people moving through the environment are dynamic. Regions in the occupancy map that the AMD has visited but which are shown by the occupancy map as containing obstacles are identified as being variable regions. To determine possible paths through the physical space during autonomous movement, the variable regions are considered to be unoccupied by obstacles and traversable. Information about how often the variable region transitions between traversable and impassible states may also be used to determine the possible paths.

20 Claims, 7 Drawing Sheets

VARIABLE REGION DATA
138

| REGION IDENTIFIER 402 | REGION CORNERS 404 | REGION TAG 406 | LAST OBSERVED STATE 408 | COUNT OF SUCCESSFUL TRAVERSALS OF THIS REGION 410 | COUNT OF FAILED TRAVERSALS OF THIS REGION 412 |
|---|---|---|---|---|---|
| 1 | (129,303),(139,323) | FRONT DOOR | CLOSED | 0 | 1 |
| 2 | (521,102),(527,114) | HALL/KITCHEN | OPEN | 197 | 31 |
| 3 | (35,70),(40,75) | KITCHEN/LIVING | CLOSED | 82 | 2 |
| 4 | (217,701), (222,715) | LIVING/BED | CLOSED | 31 | 11 |
| 5 | (71,119),(76,126) | LIVING/DEN | CLOSED | 113 | 17 |
| 6 | (413,200), (418,205) | DEN/HALL | CLOSED | 172 | 103 |

FIG. 4

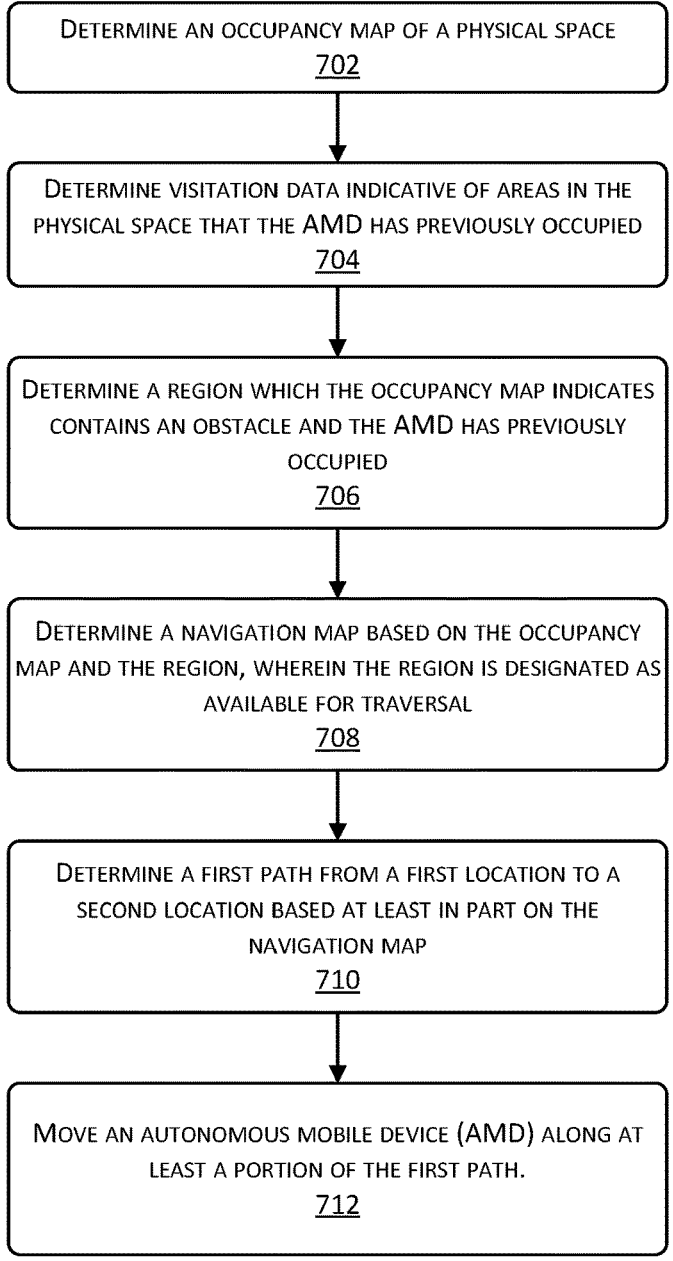

```
┌─────────────────────────────────────────┐
│ DETERMINE AN OCCUPANCY MAP OF A PHYSICAL SPACE │
│                   702                   │
└─────────────────────────────────────────┘
                    ↓
┌─────────────────────────────────────────┐
│ DETERMINE VISITATION DATA INDICATIVE OF AREAS IN THE │
│ PHYSICAL SPACE THAT THE AMD HAS PREVIOUSLY OCCUPIED │
│                   704                   │
└─────────────────────────────────────────┘
                    ↓
┌─────────────────────────────────────────┐
│ DETERMINE A REGION WHICH THE OCCUPANCY MAP INDICATES │
│ CONTAINS AN OBSTACLE AND THE AMD HAS PREVIOUSLY │
│                OCCUPIED                 │
│                   706                   │
└─────────────────────────────────────────┘
                    ↓
┌─────────────────────────────────────────┐
│ DETERMINE A NAVIGATION MAP BASED ON THE OCCUPANCY │
│ MAP AND THE REGION, WHEREIN THE REGION IS DESIGNATED AS │
│           AVAILABLE FOR TRAVERSAL       │
│                   708                   │
└─────────────────────────────────────────┘
                    ↓
┌─────────────────────────────────────────┐
│ DETERMINE A FIRST PATH FROM A FIRST LOCATION TO A │
│ SECOND LOCATION BASED AT LEAST IN PART ON THE │
│              NAVIGATION MAP             │
│                   710                   │
└─────────────────────────────────────────┘
                    ↓
┌─────────────────────────────────────────┐
│ MOVE AN AUTONOMOUS MOBILE DEVICE (AMD) ALONG AT │
│      LEAST A PORTION OF THE FIRST PATH. │
│                   712                   │
└─────────────────────────────────────────┘
```

FIG. 7

SYSTEM FOR AUTONOMOUS MOBILE DEVICE NAVIGATION IN DYNAMIC PHYSICAL SPACE

BACKGROUND

An autonomous mobile device (AMD) moves throughout a physical space. To facilitate this movement, the AMD explores the physical space to determine where obstacles are located.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features. The figures are not necessarily drawn to scale, and in some figures, the proportions or other aspects may be exaggerated to facilitate comprehension of particular aspects.

FIG. 4 illustrates variable region data used to generate a navigation map for autonomous navigation, according to some implementations.

FIG. 7 is a flow diagram of a process for using variable region data for autonomous navigation, according to some implementations.

Figure 1:
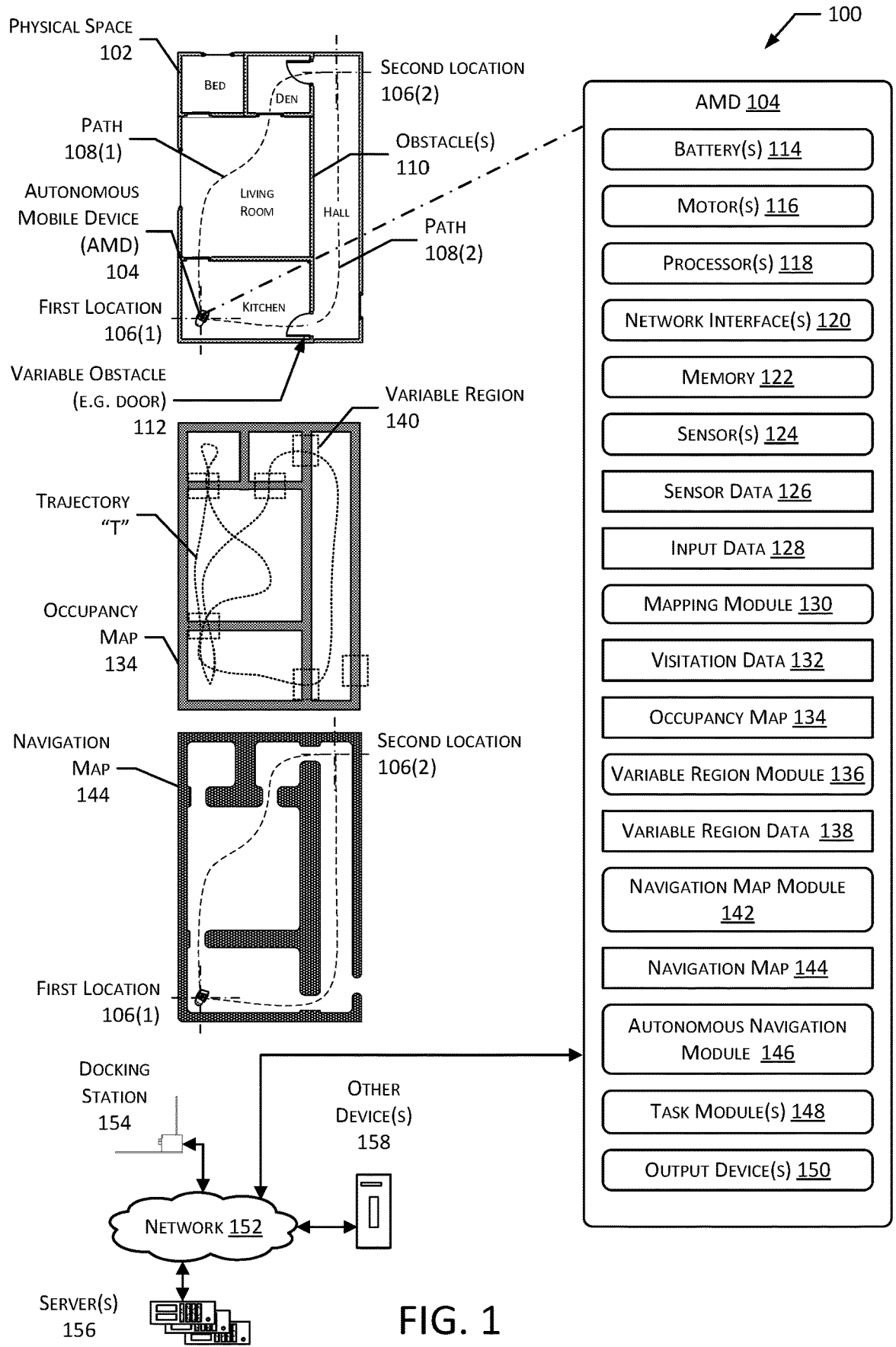
FIG. 1 illustrates a system for navigation by an autonomous mobile device (AMD) in a dynamic physical space, according to some implementations.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean "including, but not limited to".

DETAILED DESCRIPTION

An autonomous mobile device (AMD) such as a robot is capable of autonomous movement, allowing it to move from one location in the physical space to another without being "driven" or remotely controlled by a user. The AMD may perform tasks that involve moving within the physical space. These tasks may also include patrolling the physical space, interacting with users, and so forth. For example, the AMD may perform sentry tasks involving moving through rooms in the physical space.

During autonomous movement, the AMD needs to have information about where obstacles are in the physical space. This information is used to plan a path for the AMD to move, to avoid collisions with obstacles, and so forth. For example, the AMD should be able to move from a first location to a second location while avoiding collisions with furnishings, walls, people, falling down stairs, and so forth.

One or more sensors on the AMD or in the physical space acquire sensor data. The sensor data is processed to determine information such as a current location of the AMD in the physical space and to provide the information that is used to determine an occupancy map.

The occupancy map provides information about where obstacles are in the physical space. The occupancy map comprises cells in a specified arrangement, a grid of cells. Each cell may be represented by an index value indicative of that cell within the grid. Each cell is associated with a particular location in the physical space. For example, each cell may represent an area that is 5 centimeters (cm) by 5 cm. Each cell may also be associated with an obstacle value that indicates whether the particular location of that cell is occupied by an obstacle or unoccupied.

The occupancy map is determined based on sensor data that may be obtained at different times. As a result, different portions of the physical area may be observed at different times as being either occupied by an obstacle or unoccupied. Over time, this information may be used to generate an occupancy map. The last observed state may be used in the occupancy map. For example, the most recent observation that a door is closed may show the door as an obstacle on the occupancy map.

At least three types of obstacles may exist in a physical space including static obstacles, variable obstacles, and dynamic obstacles. Static obstacles are consistently detected and remain in the same location across various spans of time such as minutes, hours, days, weeks, and so forth. For example, static obstacles include walls, stairways, architectural features, large pieces of furniture, and so forth that remain in place.

In comparison, variable obstacles may be detected and occupy an area for various spans of time. These spans may include minutes, hours, days, and so forth. For example, variable obstacles may include doors, gates, cabinet doors, occasional deliveries, and so forth. A variable obstacle may be present in one area at one time, move to another area, or disappear entirely. For example, a hinged door may open or close, displacing the door between a location which blocks passage through the doorway (closed) or a location which permits passage through the doorway (opened). In another example, a pocket door may slide into a volume associated with an existing obstacle such as a wall. In yet another example, a variable obstacle may comprise occasional packages that are deposited into an entryway or hall that obstruct passage. A variable region is the physical space associated with the variable obstacle.

Dynamic obstacles may persist for shorter times spans in a particular area. For example, a dynamic obstacle may comprise another AMD, a user, a pet, or other object that moves in the environment. A dynamic obstacle may exist in a given area for spans of time such as seconds, minutes, and possibly hours. Dynamic obstacles may also be observed as having a velocity that is greater than a threshold value, exhibit particular trajectories, move farther than a minimum distance, and so forth.

Traditional systems for autonomous navigation have difficulty in coping with obstacles that may come and go in the environment. For example, as doors in the physical space open and close, what path should a robot take to get from one location to another? Existing techniques may use a last observed state of that obstacle for path planning. For example, if the door was closed last time it was seen, it will be considered an impassable obstacle until the robot observes the door to be open.

These traditional systems place serious constraints on path planning for autonomous movement. For example, the robot may not have information about the state of all doors (open or closed) at any given instant in time. As a result, the robot is navigating using a map with last known configurations of doors or other obstacles that is already out of date and may be incorrect. These constraints also could result in the robot having no known usable paths. For example, if the robot determines a door has been opened and then closed, the last known state is closed, and that door is not viable to use for a potential path. This blocks the robot from further consideration of that path. The robot may either travel along a more circuitous route, taking more time and consuming more battery power, or may not even move as no path is available.

Described in this disclosure are techniques and systems for an AMD to determine and use information about variable regions. Once a variable region has been determined any obstacles as indicated by an occupancy map, or a navigation map determined from the occupancy map, that correspond to the area in the physical space of the variable region are considered to be traversable by the AMD. For example, for path planning the cells within the variable region that the occupancy map associates with an obstacle such as a closed door are designated as being available for traversal.

In implementations where a navigation map is used, the navigation map may be determined by inflating the occupancy map and then designating that the areas associated with the variable regions are traversable. For example, the navigation map may comprise the occupancy map for which any cells associated with areas in the physical space containing obstacles have been inflated. The inflation operation enlarges the apparent size of the obstacles in the navigation map. This inflation provides a buffer of clear space around obstacles during route planning that considers the AMD to be a point object. This buffer of clear space facilitates path planning and movement of the AMD by allowing for sensor noise, variations in knowing exactly where the AMD is at any given time, and so forth. The cells associated with the variable regions may then be designated as traversable, such as setting to an obstacle value of unoccupied.

Variable regions may be determined based on a comparison of occupancy map data and previous information about where the AMD has visited. During operation, the AMD maintains visitation data that is indicative of where in the physical space the AMD has physically been. For example, the AMD may maintain a trajectory of where it has been over time. The trajectory may be combined with information about a footprint that represents the area in the physical space that the AMD occupies to determine the areas in the physical space that the AMD has occupied.

A variable region is the physical space associated with the variable obstacle. For example, at a first time the AMD may have moved through a door, while at a later time the door is observed as the AMD passes by to be closed. As a result, the area in and near the door is designated as a variable region.

In another implementation, a variable obstacle may be determined by comparing data about an area in the physical space at different times. For example, occupancy map data obtained at different times may be compared and used to determine the presence of a variable region. For example, a doorway may be observed to be unoccupied (open) at time t=0 and occupied (closed) at t=1. This change in occupancy may be used to determine that this area in the physical space is a variable obstacle.

The navigation map, as modified by the variable regions, is subsequently used for path planning. Because the variable regions are designated as being traversable, they are considered available for movement during path planning. Continuing the earlier example of the door last seen as closed, the navigation map would show that area as being open and available for movement. The navigation map is used for path planning, allowing the AMD to find a suitable route, such as by using the Theta* path planning algorithm. As the AMD moves through the physical space, if the AMD encounters an obstacle, including a variable obstacle that is now occupied and thus impassible, another available path may be determined and the AMD will try that alternate path.

In some implementations, information about previously observed states of the variable regions may be used for path planning. For example, information such as prior success rate in traversing a variable region, count of variable regions along a proposed route, frequency of successful traversal, and so forth may be used. Continuing the example, the path planning algorithm may determine path cost based on the frequency of successful traversal of regions that the path intersects. A first path which involves a first region having a relatively low frequency may have a path cost greater than a second path which involves a second region having a relatively high frequency of successful traversal. As a result, the second path with the lower path cost may be selected for use.

By using the techniques described in this disclosure, the AMD is able to traverse the physical space and account for the variable regions that may experience changes between being occupied or unoccupied. This enables the AMD to attempt to travel from a first location to a second location using shorter paths that pass through variable regions, potentially reducing transit time and power consumption, while improving the user experience.

Illustrative System

FIG. 1 illustrates a system 100 for navigating a dynamically changing physical space 102 with an autonomous mobile device (AMD) 104, according to some implementations. The physical space 102 comprises several rooms separated by doors, including a kitchen, living room, bedroom, den, and hall. These doors may be opened or closed at various times. The AMD 104 is shown at a first location 106(1) in the kitchen and is to move to a second location 106(2) in the hall. A first path 108(1) extends from the first location 106(1) in the kitchen through the living room, the den, and into the hall. A second path 108(2) extends from the first location 106(1) in the kitchen and into the hall.

One or more obstacles 110 may be present within the physical space 102. For example, obstacles 110 may comprise walls, furnishings, stair wells, people, and so forth. While moving from one location to another, the AMD 104 needs to determine where it is at a given time, determine the location of obstacles 110, and move while avoiding collisions with any of these obstacles 110. The command to move may be the result of an input from the user, a previously scheduled task, responsive to input from one or more sensors, a command from an external computing device, or another source.

At least three types of obstacles may exist in a physical space 102 including static obstacles, variable obstacles, and dynamic obstacles. For example, static obstacles are fixed, variable obstacles 112 like doors may change, and dynamic obstacles move. These types are described in more detail below.

The AMD 104 may include a battery(s) 114 to provide electrical power for operation of the AMD 104. The battery 114 may be rechargeable, allowing it to store electrical energy obtained from an external source. In other implementations a wireless power receiver may be used to provide power for operation of the AMD 104, recharge the battery 114, and so forth.

One or more motors 116 or other actuators enable the AMD 104 to move from one location in the physical space 102 to another. For example, a motor 116 may be used to drive a wheel attached to a chassis of the AMD 104, which causes the AMD 104 to move. The AMD 104 may turn, move forward, move backward, and so forth.

During use, a user may issue a command. For example, the user may provide speech input by uttering the command "robot, come here". In another example, the user may indicate the command using a computing device, such as a smartphone or tablet computer. Data indicative of the command may then be provided to the AMD 104.

The AMD 104 may include one or more hardware processors 118 (processors) configured to execute one or more stored instructions. The processors 118 may comprise one or more cores. The processors 118 may include microcontrollers, systems on a chip, field programmable gate arrays, digital signal processors, graphic processing units, general processing units, and so forth.

The AMD 104 may include one or more network interfaces 120. The network interfaces 120 may include devices to connect to personal area networks (PANs), local area networks (LANs), wireless local area networks (WLANS), wide area networks (WANs), and so forth. For example, the network interfaces 120 may include devices compatible with Ethernet, Wi-Fi, Bluetooth, Bluetooth Low Energy, ZigBee, and so forth.

The AMD 104 includes one or more memories 122. The memory 122 may comprise one or more non-transitory computer-readable storage media (CRSM).

The AMD 104 may include one or more sensors 124. For example, the sensors 124 may include microphones, time-of-flight (TOF) sensors, cameras, LIDAR, and so forth. The sensors 124 may generate sensor data 126. The sensors 124 are discussed in more detail with regard to FIG. 3.

During operation the AMD 104 may determine input data 128. The input data 128 may include or be based at least in part on sensor data 126 from the sensors 124 onboard the AMD 104. In one implementation, a speech processing module may process raw audio data obtained by a microphone on the AMD 104 and produce input data 128. For example, the user may say "robot, come here" which may produce input data 128 "come here".

A mapping module 130 determines visitation data 132 indicative of where in the physical space 102 the AMD 104 has been. In one implementation, the mapping module 130 may determine a trajectory "T" of where the AMD 104 has been at different times. The trajectory may be combined with information about a footprint that represents the area in the physical space 102 that the AMD 104 occupies to determine the areas in the physical space 102 that the AMD 104 has occupied. In some implementations the visitation data 132 may comprise information indicative of a location with respect to the physical space 102. The visitation data 132 may be stored as a layer or equivalent data structure, in which a particular value indicative of visitation is associated with a particular cell in an occupancy map 134.

The mapping module 130 also determines an occupancy map 134 that is representative of the physical features in the physical space 102. For example, the sensors 124 may comprise one or more cameras that obtain sensor data 126 comprising image data of the physical space 102. Continuing the example, TOF sensors may provide information about distance to obstacles 110. The sensor data may be processed to determine the presence of obstacles 110.

The occupancy map 134 may comprise data that indicates the location of one or more obstacles 110, such as a table, wall, stairwell, and so forth. In some implementations, the occupancy map 134 may comprise a plurality of cells with each cell of the plurality of cells representing a particular area in the physical space 102. Data, such as an obstacle value, may be stored that indicates whether a cell associated with an area in the physical space is occupied by an obstacle 110, is unoccupied, or is unobserved. An obstacle 110 may comprise an object or feature that prevents or impairs traversal by the AMD 104. For example, an obstacle 110 may comprise a wall, stairwell, and so forth.

The occupancy map 134 may be manually or automatically determined. For example, during a learning phase the user may take the AMD 104 on a tour of the physical space 102, allowing the AMD 104 to explore and generate the occupancy map 134 and associated data, such as tags designating a particular obstacle type, such as "furniture" or "fragile". In another example, during subsequent operation, the AMD 104 may generate the occupancy map 134 that is indicative of locations and types of obstacles 110 such as chairs, doors, stairwells, and so forth as it moves unattended through the physical space 102. The occupancy map 134 may include information such as tags or labels that designate particular rooms or portions of the physical space 102, and so forth.

In some implementations information associated with the physical space 102 may be stored as a multi-layered data structure. For example, a first layer may comprise the information associated with the occupancy map 134, providing information about obstacle values associated with particular areas in the physical space 102. A second layer may comprise the variable region data 138. A third layer may comprise tags, and so forth.

Modules described herein, such as the mapping module 130, may provide various processing functions such as de-noising, filtering, and so forth. Processing of sensor data 126, such as image data from a camera, may be performed by a module implementing, at least in part, one or more of the following tools or techniques. In one implementation, processing of image data may be performed, at least in part, using one or more tools available in the OpenCV library as developed by Intel Corporation of Santa Clara, Calif., USA; Willow Garage of Menlo Park, Calif., USA; and Itseez of Nizhny Novgorod, Russia, with information available at www.opencv.org. In another implementation, functions available in the OKAO machine vision library as promulgated by Omron Corporation of Kyoto, Japan, may be used to process the sensor data 126. In still another implementation, functions such as those in the Machine Vision Toolbox (MVTB) available using MATLAB as developed by Math Works, Inc. of Natick, Mass., USA, may be utilized.

Techniques such as artificial neural networks (ANNs), convolutional neural networks (CNNs), active appearance models (AAMs), active shape models (ASMs), principal component analysis (PCA), cascade classifiers, and so forth, may also be used to process the sensor data 126 or other data. For example, the ANN may be trained using a supervised learning algorithm such that object identifiers are associated with images of particular objects within training images provided to the ANN. Once trained, the ANN may be provided with the sensor data 126 and produce output indicative of the object identifier.

A variable region module 136 may use one or more of the occupancy maps 132 or the sensor data 126 to determine variable region data 138. At least three types of obstacles may exist in a physical space 102 including static obstacles, variable obstacles, and dynamic obstacles.

Static obstacles are consistently detected and remain in the same location across various spans of time such as minutes, hours, days, weeks, and so forth. For example, static obstacles include walls, stairways, architectural features, large pieces of furniture, and so forth that remain in place.

In comparison, variable obstacles may be detected and remain present for various spans of time. These spans may include minutes, hours, days, and so forth. For example, variable obstacles 112 may include doors, gates, cabinet doors, occasional deliveries, and so forth. A variable obstacle may be present in one area, move to another, or disappear entirely. For example, a hinged door may open or close, displacing the door between a location which blocks passage through the doorway (closed) or a location which permits passage through the doorway (opened). In another example, a pocket door may slide into a volume associated with an existing obstacle such as a wall. In yet another example, a variable obstacle may comprise packages that are deposited into an entryway or hall that obstruct passage.

Variable obstacles 112, such as doors, gates, cabinet doors, and so forth present in the physical space 102 may constrain movement. In one example, a door may be present between rooms or other spaces in the physical space 102 and may constrain movement from one room to another. If a door is open, the AMD 104 may move through the door from one room to another. If the door is closed, the AMD 104 may not move through the door. Likewise, presence or absence of a gate, cabinet door, and so forth could constrain movement in the physical space 102.

A variable region 140 is the physical space associated with the variable obstacle. The variable region module 136 determines variable region data 138 that indicates the variable regions 140 in the physical space 102. For example, the variable region module 136 may use the visitation data 132 and the occupancy map 134 to determine a region in the physical space 102 where the occupancy map 134 indicates the presence of an obstacle 110, such as a cell with an obstacle value of "occupied", and the visitation data 132 indicates that the region or a portion thereof was previously visited by the AMD 104. The variable region data 138 is discussed in more detail with regard to FIG. 4, while determination of the data is discussed in more detail with regard to FIG. 6. Continuing the earlier example, the variable region 140 may comprise an area in and near the doorway. Dynamic obstacles may persist for shorter time spans in a particular area. For example, a dynamic obstacle may comprise another AMD, a user, a pet, or other object that moves in the environment. A dynamic obstacle may exist in a given area for spans of time such as seconds, minutes, and possibly hours. Dynamic obstacles may also be observed as having a velocity that is greater than a threshold value, exhibit particular trajectories, move farther than a minimum distance, and so forth.

The navigation map module 142 may determine the navigation map 144 by inflating or enlarging the apparent size of obstacles 110 as indicated by the occupancy map 134 using one or more inflation parameters and the variable region data 138. For example, an inflation parameter may indicate an inflation distance of 10 cm, in which case cells within 10 cm of a cell designated as occupied in an inflated occupancy map would be designated as being occupied as well. The inflation operation enlarges the apparent size of the obstacles 110 as they are represented in the navigation map 144. This inflation provides a buffer of clear space around obstacles 110. This buffer of clear space facilitates path planning in situations where the AMD 104 is considered a point object and also facilitates movement of the AMD 104 by allowing for sensor noise, variations in localization of the AMD 104 at any given time, and so forth. The cells in the inflated occupancy map associated with the variable regions 140 may then be designated as traversable. For example, if a variable obstacle 112 such as a door is designated as a variable region 140, the cells in the navigation map 144 that are associated with that region would be designated as unoccupied with an obstacle value of 0, and thus traversal is permitted during path planning. This designation is without regard to the last observed state of the variable obstacle 112. Continuing the example, if the door was last observed closed, the area associated with that door would appear in the navigation map 144 as being unoccupied. This is depicted with regard to FIG. 5.

In some implementations, additional obstacle values may be used. For example, an obstacle value of 0 may indicate unoccupied (traversal permitted), an obstacle value of 1 may indicate occupied (traversal prohibited), and an obstacle value of 2 may indicate a variable obstacle (traversal permitted).

An autonomous navigation module 146 provides the AMD 104 with the ability to navigate within the physical space 102 without real-time human interaction. The autonomous navigation module 146 may implement, or operate in conjunction with, the mapping module 130 to determine one or more of the occupancy maps 132, the occupancy map 134, the navigation map 144, or other representations of the physical space 102. The autonomous navigation module 146 is discussed in more detail with regard to FIG. 2.

The AMD 104 autonomous navigation module 146 may generate path plan data that is indicative of a path 108 through the physical space 102 from the first location 106(1) to the second location 106(2). The AMD 104 may then begin moving along the path 108.

While moving along the path 108, the AMD 104 may assess the physical space 102 and update or change the path 108 as appropriate. For example, if an obstacle 110 such as a closed door appears in the path 108, the mapping module 130 may determine the presence of the obstacle 110. The navigation map 144 may then be used by the autonomous navigation module 146 to plan an alternative path to the destination location.

In some implementations, the determination of the obstacle 110 in a particular variable region 140 may result in that particular variable region 140 being removed from the variable region data 138. For example, as the AMD 104 approaches the variable region 140(1), if the sensor data 126 is indicative of an obstacle being present, then variable region 140(1) may be removed from the variable region data 138. Responsive to the obstacle, the autonomous navigation module 146 may determine another path.

The AMD 104 may utilize one or more task modules 148. The task module 148 comprises instructions that, when executed, provide one or more functions. The task modules 148 may perform functions such as finding a user, following a user, present output on output devices 150 of the AMD 104, perform sentry tasks by moving the AMD 104 through the physical space 102 to determine the presence of unauthorized people, and so forth.

The AMD 104 includes one or more output devices 150, such as one or more of a motor 116, light, speaker, display, projector, printer, and so forth. One or more output devices 150 may be used to provide output during operation of the AMD 104. The output devices 150 are discussed in more detail with regard to FIG. 3.

The AMD 104 may use the network interfaces 120 to connect to a network 152. For example, the network 152 may comprise a wireless local area network, that in turn is connected to a wide area network such as the Internet.

The AMD 104 may be configured to dock or connect to a docking station 154. The docking station 154 may also be connected to the network 152. For example, the docking station 154 may be configured to connect to the wireless local area network 152 such that the docking station 154 and the AMD 104 may communicate. The docking station 154 may provide external power which the AMD 104 may use to charge the battery 114.

The AMD 104 may access one or more servers 156 via the network 152. For example, the AMD 104 may utilize a wakeword detection module to determine if the user is addressing a request to the AMD 104. The wakeword detection module may hear a specified word or phrase and transition the AMD 104 or portion thereof to the wake operating mode. Once in the wake operating mode, the AMD 104 may then transfer at least a portion of the audio spoken by the user to one or more servers 156 for further processing. The servers 156 may process the spoken audio and return to the AMD 104 data that may be subsequently used to operate the AMD 104.

The AMD 104 may also communicate with other devices 158. The other devices 158 may include one or more devices that are within the physical space 102, such as a home or associated with operation of one or more devices in the home. For example, the other devices 158 may include a doorbell camera, a garage door opener, a refrigerator, washing machine, and so forth. In some implementations the other devices 158 may include other AMDs 104, vehicles, and so forth.

In other implementations, other types of autonomous mobile devices (AMD) may use the systems and techniques described herein. For example, the AMD 104 may comprise an autonomous ground vehicle that is moving on a street, an autonomous aerial vehicle in the air, autonomous marine vehicle, and so forth.

Figure 2:
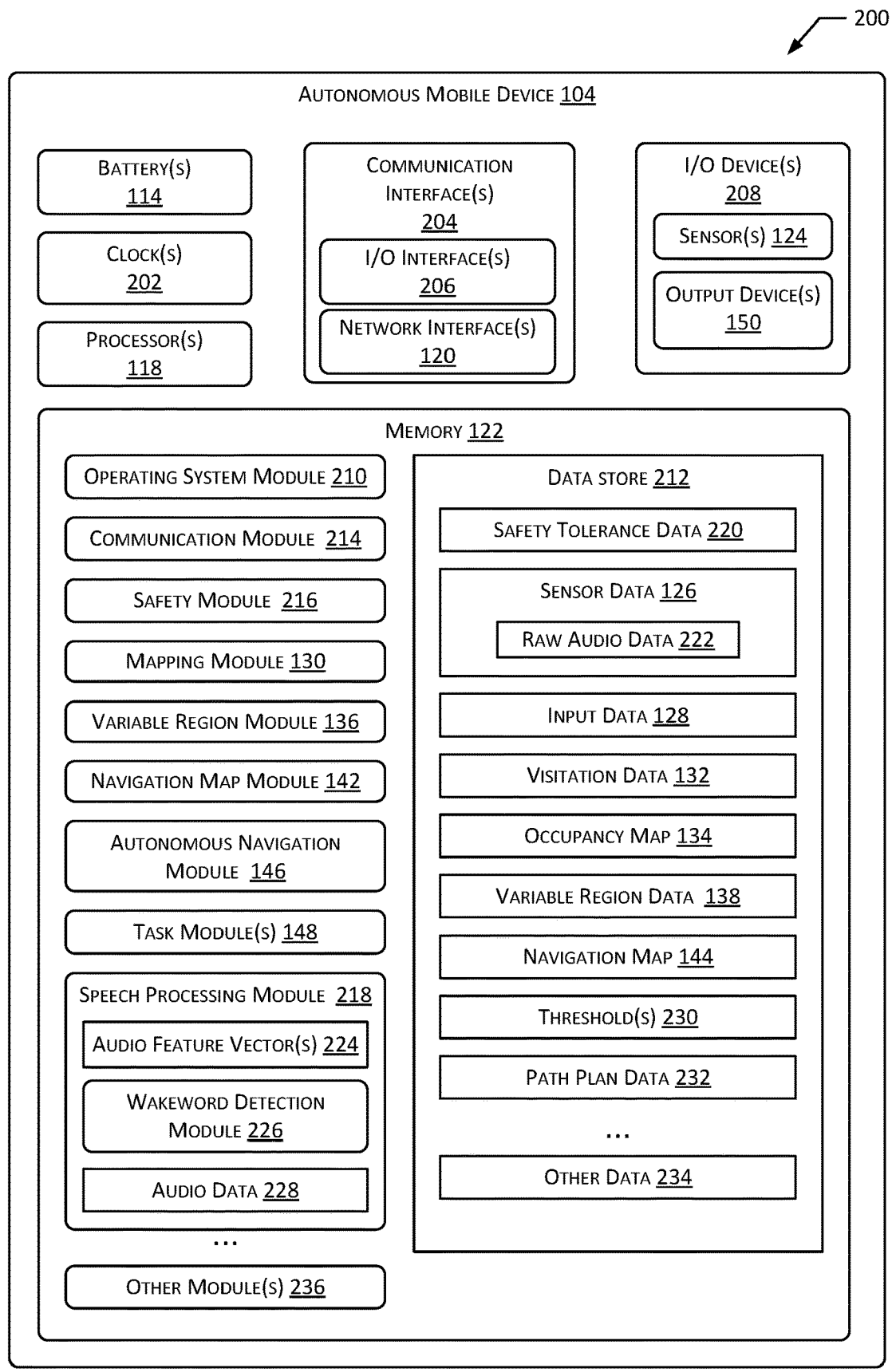
FIG. 2 is a block diagram of the components of the AMD, according to some implementations.

FIG. 2 is a block diagram 200 of the AMD 104, according to some implementations. The AMD 104 may include one or more batteries 114 to provide electrical power suitable for operating the components in the AMD 104. In some implementations other devices may be used to provide electrical power to the AMD 104. For example, power may be provided by wireless power transfer, capacitors, fuel cells, storage flywheels, and so forth.

One or more clocks 202 may provide information indicative of date, time, ticks, and so forth. For example, the processor 118 may use data from the clock 202 to associate a particular time with an action, sensor data 126, and so forth.

The AMD 104 may include one or more hardware processors 118 (processors) configured to execute one or more stored instructions. The processors 118 may comprise one or more cores. The processors 118 may include microcontrollers, systems on a chip, field programmable gate arrays, digital signal processors, graphic processing units, general processing units, and so forth.

The AMD 104 may include one or more communication interfaces 204 such as input/output (I/O) interfaces 206, network interfaces 120, and so forth. The communication interfaces 204 enable the AMD 104, or components thereof, to communicate with other devices 158 or components. The communication interfaces 204 may include one or more I/O interfaces 206. The I/O interfaces 206 may comprise Inter-Integrated Circuit (I2C), Serial Peripheral Interface bus (SPI), Universal Serial Bus (USB) as promulgated by the USB Implementers Forum, RS-232, and so forth.

The I/O interface(s) 206 may couple to one or more I/O devices 208. The I/O devices 208 may include input devices such as one or more of a sensor 124, keyboard, mouse, scanner, and so forth. The I/O devices 208 may also include output devices 150 such as one or more of a motor 116, light, speaker, display, projector, printer, and so forth. In some embodiments, the I/O devices 208 may be physically incorporated with the AMD 104 or may be externally placed.

The network interfaces 120 may be configured to provide communications between the AMD 104 and other devices 158 such as other AMDs 104, docking stations 154, routers, access points, and so forth. The network interfaces 120 may include devices configured to couple to personal area networks (PANs), local area networks (LANs), wireless local area networks (WLANS), wide area networks (WANs), and so forth. For example, the network interfaces 120 may include devices compatible with Ethernet, Wi-Fi, Bluetooth, Bluetooth Low Energy, ZigBee, and so forth.

The AMD 104 may also include one or more busses or other internal communications hardware or software that allow for the transfer of data between the various modules and components of the AMD 104.

As shown in FIG. 2, the AMD 104 includes one or more memories 122. The memory 122 may comprise one or more non-transitory computer-readable storage media (CRSM). The CRSM may be any one or more of an electronic storage medium, a magnetic storage medium, an optical storage medium, a quantum storage medium, a mechanical computer storage medium, and so forth. The memory 122 provides storage of computer-readable instructions, data structures, program modules, and other data for the operation of the AMD 104. A few example functional modules are shown stored in the memory 122, although the same functionality may alternatively be implemented in hardware, firmware, or as a system on a chip (SoC).

The memory 122 may include at least one operating system (OS) module 210. The OS module 210 is configured to manage hardware resource devices such as the I/O interfaces 206, the I/O devices 208, the communication interfaces 204, and provide various services to applications or modules executing on the processors 118. The OS module 210 may implement a variant of the FreeBSD operating system as promulgated by the FreeBSD Project; other UNIX or UNIX-like variants; a variation of the Linux operating system as promulgated by Linus Torvalds; the Windows operating system from Microsoft Corporation of Redmond, Wash., USA; the AMD Operating System (ROS) as promulgated at www.ros.org, and so forth.

Also stored in the memory 122 may be a data store 212 and one or more of the following modules. These modules may be executed as foreground applications, background tasks, daemons, and so forth. The data store 212 may use a flat file, database, linked list, tree, executable code, script, or other data structure to store information. In some implementations, the data store 212 or a portion of the data store 212 may be distributed across one or more other devices 158 including other AMDs 104, servers 156, network attached storage devices, and so forth.

A communication module 214 may be configured to establish communication with other devices 158, such as other AMDs 104, an external server 156, a docking station 154, and so forth. The communications may be authenticated, encrypted, and so forth.

Other modules within the memory 122 may include a safety module 216, the mapping module 130, the variable region module 136, the navigation map module 142, the autonomous navigation module 146, the one or more task modules 148, a speech processing module 218, or other modules 236. The modules may access data stored within the data store 212, including safety tolerance data 220, sensor data 126, thresholds 230, path plan data 232, other data 234, and so forth.

The safety module 216 may access the safety tolerance data 220 to determine within what tolerances the AMD 104 may operate safely within the physical space 102. For example, the safety module 216 may be configured to stop the AMD 104 from moving when an extensible mast of the AMD 104 is extended. In another example, the safety tolerance data 220 may specify a minimum sound threshold which, when exceeded, stops all movement of the AMD 104. Continuing this example, detection of sound such as a human yell would stop the AMD 104. In another example, the safety module 216 may access safety tolerance data 220 that specifies a minimum distance from an object that the AMD 104 is to maintain. Continuing this example, when a sensor 124 detects an object has approached to less than the minimum distance, all movement of the AMD 104 may be stopped. Movement of the AMD 104 may be stopped by one or more of inhibiting operations of one or more of the motors 116, issuing a command to stop motor operation, disconnecting power from one or more the motors 116, and so forth. The safety module 216 may be implemented as hardware, software, or a combination thereof.

The safety module 216 may control other factors, such as a maximum speed of the AMD 104 based on information obtained by the sensors 124, precision and accuracy of the sensor data 126, and so forth. For example, detection of an object by an optical sensor may include some error, such as when the distance to an object comprises a weighted average between an object and a background. As a result, the maximum speed permitted by the safety module 216 may be based on one or more factors such as the weight of the AMD 104, nature of the floor, distance to the object, and so forth. In the event that the maximum permissible speed differs from the maximum speed permitted by the safety module 216, the lesser speed may be utilized.

The mapping module 130 may use one or more of sensor data 126, input data 128, and so forth to determine the occupancy map 134 that is representative of the physical features in the physical space 102. In some implementations, the mapping module 130 may operate in conjunction with, or instead of, the variable region module 136 to determine variable region data 138. For example, during a learning phase the user may take the AMD 104 on a tour of the physical space 102, allowing the AMD 104 to explore and generate the occupancy map 134 and associated data, including receiving input data 128 that designates a particular obstacle type, door, gate, moveable furniture, and so forth. In another example, during subsequent operation, the AMD 104 may generate the occupancy map 134 as it moves unattended through the physical space 102.

In some implementations, the mapping module 130 may use neural networks or other systems to determine the presence and location of a variable region 140. For example, the mapping module 130 may utilize a neural network or other machine learning system that has been trained to recognized doors 112. In some implementations, the occupancy map 134 may include data indicative of a type of feature, such as door, windows, cabinet, and so forth. This data may then be used by one or more of the variable region module 136 or the navigation map module 142.

The navigation map module 142 may use the occupancy map 134 and the variable region data 138 as input to generate the navigation map 144. As described above, the navigation map module 142 may modify an inflated occupancy map to determine the navigation map 144 by designating the variable regions 140 indicated by the variable region data 138 as being unoccupied.

One or more inflation parameters may be used during operation of the navigation map module 142. The inflation parameters provide information such as inflation distance, inflation adjustment values, and so forth. In some implementations the inflation parameters may be based at least in part on the sensor field of view (FOV), physical dimensions of the AMD 104, localization accuracy, and so forth. For example, the navigation map module 142 may inflate the apparent area of an obstacle 110 by an inflation distance that is greater than one half the width of the AMD 104.

The autonomous navigation module 146 provides the AMD 104 with the ability to navigate within the physical space 102 without real-time human interaction. The autonomous navigation module 146 may implement, or operate in conjunction with, the mapping module 130 to determine the occupancy map 134, the navigation map 144, or other representation of the physical space 102. In one implementation, the mapping module 130 may use one or more simultaneous localization and mapping ("SLAM") techniques. The SLAM algorithms may utilize one or more of maps, algorithms, beacons, or other techniques to navigate. The autonomous navigation module 146 may use the navigation map 144 to determine a set of possible paths 108 along which the AMD 104 may move. One of these may be selected and used to determine path plan data 232 indicative of a path 108. For example, a possible path 108 that is the shortest, or has the fewest turns, traverses the fewest variable regions 140, and so forth may be selected and used to determine the path 108. In one implementation, the Theta* path planning algorithm may be used to determine a path cost for each path 108, and the path cost may be used to select a particular path 108. (See "Theta*: Any-Angle Path Planning on Grids", Alex Nash, Kenny Daniel, Sven Koenig, Ariel Felner.)

The path 108 is then subsequently used to determine a set of commands that drive the motors 116 connected to the wheels. For example, the autonomous navigation module 146 may determine the first location 106(1) within the physical space 102 and determine path plan data 232 that describes the path 108 to a second location 106(2).

The autonomous navigation module 146 may utilize various techniques during processing of sensor data 126. For example, image data obtained from cameras on the AMD 104 may be processed to determine one or more of corners, edges, planes, and so forth. In some implementations corners may be detected and the coordinates of those corners may be used to produce point cloud data. This point cloud data may then be used for SLAM or other purposes associated with mapping, navigation, and so forth.

The AMD 104 may move responsive to a determination made by an onboard processor 118, in response to a command received from one or more communication interfaces 204, as determined from the sensor data 126, and so forth. For example, an external server 156 may send a command that is received using the network interface 120. This command may direct the AMD 104 to proceed to find a particular user, follow a particular user, and so forth. The AMD 104 may then process this command and use the autonomous navigation module 146 to determine the directions and distances associated with carrying out the command. For example, the command to "come here" may result in a task module 148 sending a command to the autonomous navigation module 146 to move the AMD 104 to a particular location near the user and orient the AMD 104 in a particular direction.

The speech processing module 218 may be used to process utterances of the user. Microphones may acquire audio in the presence of the AMD 104 and may send raw audio data 222 to an acoustic front end (AFE). The AFE may transform the raw audio data 222 (for example, a single-channel, 16-bit audio stream sampled at 16 kHz), captured by the microphone, into audio feature vectors 224 that may ultimately be used for processing by various components, such as a wakeword detection module 226, speech recognition engine, or other components. The AFE may reduce noise in the raw audio data 222. The AFE may also perform acoustic echo cancellation (AEC) or other operations to account for output audio data that may be sent to a speaker of the AMD 104 for output. For example, the AMD 104 may be playing music or other audio that is being received from a network 152 in the form of output audio data. To avoid the output audio interfering with the device's ability to detect and process input audio, the AFE or other component may perform echo cancellation to remove the output audio data from the input raw audio data 222, or other operations.

The AFE may divide the raw audio data 222 into frames representing time intervals for which the AFE determines a number of values (i.e., features) representing qualities of the raw audio data 222, along with a set of those values (i.e., a feature vector or audio feature vector 224) representing features/qualities of the raw audio data 222 within each frame. A frame may be a certain period of time, for example a sliding window of 25 ms of audio data 228 taken every 10 ms, or the like. Many different features may be determined, as known in the art, and each feature represents some quality of the audio that may be useful for automatic speech recognition (ASR) processing, wakeword detection, presence detection, or other operations. A number of approaches may be used by the AFE to process the raw audio data 222, such as mel-frequency cepstral coefficients (MFCCs), log filter-bank energies (LFBEs), perceptual linear predictive (PLP) techniques, neural network feature vector techniques, linear discriminant analysis, semi-tied covariance matrices, or other approaches known to those skilled in the art.

The audio feature vectors 224 (or the raw audio data 222) may be input into a wakeword detection module 226 that is configured to detect keywords spoken in the audio. The wakeword detection module 226 may use various techniques to determine whether audio data 228 includes speech. Some embodiments may apply voice activity detection (VAD) techniques. Such techniques may determine whether speech is present in an audio input based on various quantitative aspects of the audio input, such as the spectral slope between one or more frames of the audio input; the energy levels of the audio input in one or more spectral bands; the signal-to-noise ratios of the audio input in one or more spectral bands; or other quantitative aspects. In other embodiments, the AMD 104 may implement a limited classifier configured to distinguish speech from background noise. The classifier may be implemented by techniques such as linear classifiers, support vector machines, and decision trees. In still other embodiments, Hidden Markov Model (HMM) or Gaussian Mixture Model (GMM) techniques may be applied to compare the audio input to one or more acoustic models in speech storage, which acoustic models may include models corresponding to speech, noise (such as environmental noise or background noise), or silence. Still other techniques may be used to determine whether speech is present in the audio input.

Once speech is detected in the audio received by the AMD 104 (or separately from speech detection), the AMD 104 may use the wakeword detection module 226 to perform wakeword detection to determine when a user intends to speak a command to the AMD 104. This process may also be referred to as keyword detection, with the wakeword being a specific example of a keyword. Specifically, keyword detection is typically performed without performing linguistic analysis, textual analysis, or semantic analysis. Instead, incoming audio is analyzed to determine if specific characteristics of the audio match preconfigured acoustic waveforms, audio signatures, or other data to determine if the incoming audio "matches" stored audio data corresponding to a keyword.

Thus, the wakeword detection module 226 may compare audio data 228 to stored models or data to detect a wakeword. One approach for wakeword detection applies general large vocabulary continuous speech recognition (LVCSR) systems to decode the audio signals, with wakeword searching conducted in the resulting lattices or confusion networks. LVCSR decoding may require relatively high computational resources. Another approach for wakeword spotting builds HMMs for each key wakeword word and non-wakeword speech signals respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on keyword presence. This approach can be extended to include discriminative information by incorporating a hybrid deep neural network (DNN) Hidden Markov Model (HMM) decoding framework. In another embodiment, the wakeword spotting system may be built on DNN/recursive neural network (RNN) structures directly, without HMM involved. Such a system may estimate the posteriors of wakewords with context information, either by stacking frames within a context window for DNN, or using RNN. Following on, posterior threshold tuning or smoothing is applied for decision making. Other techniques for wakeword detection, such as those known in the art, may also be used.

Once the wakeword is detected, circuitry or applications of the local AMD 104 may "wake" and begin transmitting audio data 228 (which may include one or more of the raw audio data 222 or the audio feature vectors 224) to one or more server(s) 156 for speech processing. The audio data 228 corresponding to audio obtained by the microphone may be processed locally on one or more of the processors 118, sent to a server 156 for routing to a recipient device or may be sent to the server 156 for speech processing for interpretation of the included speech (either for purposes of enabling voice-communications and/or for purposes of executing a command in the speech). The audio data 228 may include data corresponding to the wakeword, or the portion of the audio data 228 corresponding to the wakeword may be removed by the AMD 104 before processing by the navigation map module 142, prior to sending to the server 156, and so forth.

The speech processing module 218 may include or access an automated speech recognition (ASR) module. The ASR module may accept as input raw audio data 222, audio feature vectors 224, or other sensor data 126 and so forth and may produce as output the input data 128 comprising a text string or other data representation. The input data 128 comprising the text string or other data representation may be processed by the navigation map module 142 to determine the command to be executed. For example, the utterance of the command "robot, come here" may result in input data 128 comprising the text string "come here". The wakeword "robot" may be omitted from the input data 128.

The AMD 104 may connect to the network 152 using one or more of the network interfaces 120. In some implementations, one or more of the modules or other functions described here may execute on the processors 118 of the AMD 104, on the server 156, or a combination thereof. For example, one or more servers 156 may provide various functions, such as ASR, natural language understanding (NLU), providing content such as audio or video to the AMD 104, and so forth.

The other modules 236 may provide other functionality, such as object recognition, speech synthesis, user identification, and so forth. The other modules 236 may comprise a speech synthesis module that is able to convert text data to human speech. For example, the speech synthesis module may be used by the AMD 104 to provide speech that a user is able to understand.

The data store 212 may store the other data 234 as well. For example, localization settings may indicate local preferences such as language, user identifier data may be stored that allows for identification of a particular user, and so forth.

Figure 3:
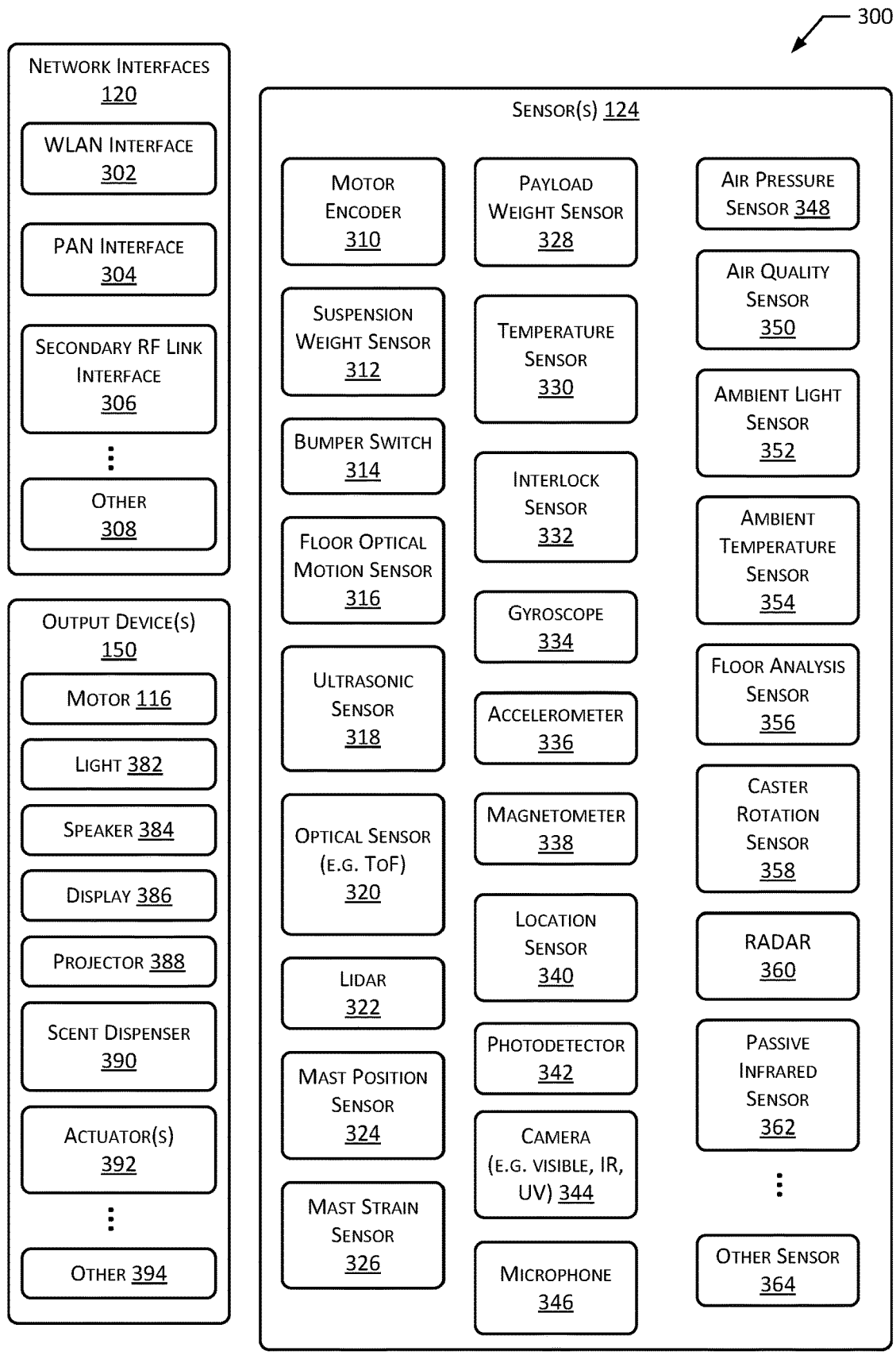
FIG. 3 is a block diagram of some components of the AMD, such as network interfaces, sensors, and output devices, according to some implementations.

FIG. 3 is a block diagram 300 of some components of the AMD 104 such as network interfaces 120, sensors 124, and output devices 150, according to some implementations. The components illustrated here are provided by way of illustration and not necessarily as a limitation. For example, the AMD 104 may utilize a subset of the particular network interfaces 120, output devices 150, or sensors 124 depicted here, or may utilize components not pictured. One or more of the sensors 124, output devices 150, or a combination thereof may be included on a moveable component that may be panned, tilted, rotated, or any combination thereof with respect to a chassis of the AMD 104.

The network interfaces 120 may include one or more of a WLAN interface 302, PAN interface 304, secondary radio frequency (RF) link interface 306, or other interface 308. The WLAN interface 302 may be compliant with at least a portion of the Wi-Fi specification. For example, the WLAN interface 302 may be compliant with at least a portion of the IEEE 802.11 specification as promulgated by the Institute of Electrical and Electronics Engineers (IEEE). The PAN interface 304 may be compliant with at least a portion of one or more of the Bluetooth, wireless USB, Z-Wave, ZigBee, or other standards. For example, the PAN interface 304 may be compliant with the Bluetooth Low Energy (BLE) specification.

The secondary RF link interface 306 may comprise a radio transmitter and receiver that operate at frequencies different from or using modulation different from the other interfaces. For example, the WLAN interface 302 may utilize frequencies in the 2.4 GHz and 5 GHz Industrial Scientific and Medicine (ISM) bands, while the PAN interface 304 may utilize the 2.4 GHz ISM bands. The secondary RF link interface 306 may comprise a radio transmitter that operates in the 900 MHz ISM band, within a licensed band at another frequency, and so forth. The secondary RF link interface 306 may be utilized to provide backup communication between the AMD 104 and other devices 158 in the event that communication fails using one or more of the WLAN interface 302 or the PAN interface 304. For example, in the event the AMD 104 travels to an area within the physical space 102 that does not have Wi-Fi coverage, the AMD 104 may use the secondary RF link interface 306 to communicate with another device such as a specialized access point, docking station 154, or other AMD 104.

The other 308 network interfaces may include other equipment to send or receive data using other wavelengths or phenomena. For example, the other 308 network interface may include an ultrasonic transceiver used to send data as ultrasonic sounds, a visible light system that communicates by modulating a visible light source such as a light-emitting diode, and so forth. In another example, the other 308 network interface may comprise a wireless wide area network (WWAN) interface or a wireless cellular data network interface. Continuing the example, the other 308 network interface may be compliant with at least a portion of the 3G, 4G, LTE, or other standards.

The AMD 104 may include one or more of the following sensors 124. The sensors 124 depicted here are provided by way of illustration and not necessarily as a limitation. It is understood that other sensors 124 may be included or utilized by the AMD 104, while some sensors 124 may be omitted in some configurations.

A motor encoder 310 provides information indicative of the rotation or linear extension of a motor 116. The motor 116 may comprise a rotary motor, or a linear actuator. In some implementations, the motor encoder 310 may comprise a separate assembly such as a photodiode and encoder wheel that is affixed to the motor 116. In other implementations, the motor encoder 310 may comprise circuitry configured to drive the motor 116. For example, the autonomous navigation module 146 may utilize the data from the motor encoder 310 to estimate a distance traveled.

A suspension weight sensor 312 provides information indicative of the weight of the AMD 104 on the suspension system for one or more of the wheels or the caster. For example, the suspension weight sensor 312 may comprise a switch, strain gauge, load cell, photodetector, or other sensing element that is used to determine whether weight is applied to a particular wheel, or whether weight has been removed from the wheel. In some implementations, the suspension weight sensor 312 may provide binary data such as a "1" value indicating that there is a weight applied to the wheel, while a "0" value indicates that there is no weight applied to the wheel. In other implementations, the suspension weight sensor 312 may provide an indication such as so many kilograms of force or newtons of force. The suspension weight sensor 312 may be affixed to one or more of the wheels or the caster. In some situations, the safety module 216 may use data from the suspension weight sensor 312 to determine whether or not to inhibit operation of one or more of the motors 116. For example, if the suspension weight sensor 312 indicates no weight on the suspension, the implication is that the AMD 104 is no longer resting on its wheels, and thus operation of the motors 116 may be inhibited. In another example, if the suspension weight sensor 312 indicates weight that exceeds a threshold value, the implication is that something heavy is resting on the AMD 104 and thus operation of the motors 116 may be inhibited.

One or more bumper switches 314 provide an indication of physical contact between a bumper or other member that is in mechanical contact with the bumper switch 314. The safety module 216 utilizes sensor data 126 obtained by the bumper switches 314 to modify the operation of the AMD 104. For example, if the bumper switch 314 associated with a front of the AMD 104 is triggered, the safety module 216 may drive the AMD 104 backwards.

A floor optical motion sensor (FOMS) 316 provides information indicative of motion of the AMD 104 relative to the floor or other surface underneath the AMD 104. In one implementation, the FOMS 316 may comprise a light source such as light-emitting diode (LED), an array of photodiodes, and so forth. In some implementations, the FOMS 316 may utilize an optoelectronic sensor, such as a low-resolution two-dimensional array of photodiodes. Several techniques may be used to determine changes in the data obtained by the photodiodes and translate this into data indicative of a direction of movement, velocity, acceleration, and so forth. In some implementations, the FOMS 316 may provide other information, such as data indicative of a pattern present on the floor, composition of the floor, color of the floor, and so forth. For example, the FOMS 316 may utilize an optoelectronic sensor that may detect different colors or shades of gray, and this data may be used to generate floor characterization data. The floor characterization data may be used for navigation.

An ultrasonic sensor 318 utilizes sounds in excess of 20 kHz to determine a distance from the sensor 124 to an object. The ultrasonic sensor 318 may comprise an emitter such as a piezoelectric transducer and a detector such as an ultrasonic microphone. The emitter may generate specifically timed pulses of ultrasonic sound while the detector listens for an echo of that sound being reflected from an object within the field of view. The ultrasonic sensor 318 may provide information indicative of a presence of an object, distance to the object, and so forth. Two or more ultrasonic sensors 318 may be utilized in conjunction with one another to determine a location within a two-dimensional plane of the object.

In some implementations, the ultrasonic sensor 318 or a portion thereof may be used to provide other functionality. For example, the emitter of the ultrasonic sensor 318 may be used to transmit data and the detector may be used to receive data transmitted that is ultrasonic sound. In another example, the emitter of an ultrasonic sensor 318 may be set to a particular frequency and used to generate a particular waveform such as a sawtooth pattern to provide a signal that is audible to an animal, such as a dog or a cat.

An optical sensor 320 may provide sensor data 126 indicative of one or more of a presence or absence of an object, a distance to the object, or characteristics of the object. The optical sensor 320 may use time-of-flight (ToF), structured light, interferometry, or other techniques to generate the distance data. For example, ToF determines a propagation time (or "round-trip" time) of a pulse of emitted light from an optical emitter or illuminator that is reflected or otherwise returned to an optical detector. By dividing the propagation time in half and multiplying the result by the speed of light in air, the distance to an object may be determined. The optical sensor 320 may utilize one or more sensing elements. For example, the optical sensor 320 may comprise a 4×4 array of light sensing elements. Each individual sensing element may be associated with a field of view (FOV) that is directed in a different way. For example, the optical sensor 320 may have four light sensing elements, each associated with a different 10° FOV, allowing the sensor to have an overall FOV of 40°.

In another implementation, a structured light pattern may be provided by the optical emitter. A portion of the structured light pattern may then be detected on the object using a sensor 124 such as an image sensor or camera 344. Based on an apparent distance between the features of the structured light pattern, the distance to the object may be calculated. Other techniques may also be used to determine distance to the object. In another example, the color of the reflected light may be used to characterize the object, such as whether the object is skin, clothing, flooring, upholstery, and so forth. In some implementations, the optical sensor 320 may operate as a depth camera, providing a two-dimensional image of a scene, as well as data that indicates a distance to each pixel.

Data from the optical sensors 320 may be utilized for collision avoidance. For example, the safety module 216 and the autonomous navigation module 146 may utilize the sensor data 126 indicative of the distance to an object in order to prevent a collision with that object.

Multiple optical sensors 320 may be operated such that their FOV overlap at least partially. To minimize or eliminate interference, the optical sensors 320 may selectively control one or more of the timing, modulation, or frequency of the light emitted. For example, a first optical sensor 320 may emit light modulated at 30 kHz while a second optical sensor 320 emits light modulated at 33 kHz.

A lidar 322 sensor provides information indicative of a distance to an object or portion thereof by utilizing laser light. The laser is scanned across a scene at various points, emitting pulses which may be reflected by objects within the scene. Based on the time-of-flight distance to that particular point, sensor data 126 may be generated that is indicative of the presence of objects and the relative positions, shapes, and so forth that are visible to the lidar 322. Data from the lidar 322 may be used by various modules. For example, the autonomous navigation module 146 may utilize point cloud data generated by the lidar 322 for localization of the AMD 104 within the physical space 102.

The AMD 104 may include a mast. A mast position sensor 324 provides information indicative of a position of the mast of the AMD 104. For example, the mast position sensor 324 may comprise limit switches associated with the mast extension mechanism that indicate whether the mast is at an extended or retracted position. In other implementations, the mast position sensor 324 may comprise an optical code on at least a portion of the mast that is then interrogated by an optical emitter and a photodetector to determine the distance to which the mast is extended. In another implementation, the mast position sensor 324 may comprise an encoder wheel that is attached to a mast motor that is used to raise or lower the mast. The mast position sensor 324 may provide data to the safety module 216. For example, if the AMD 104 is preparing to move, data from the mast position sensor 324 may be checked to determine if the mast is retracted, and if not, the mast may be retracted prior to beginning movement.

A mast strain sensor 326 provides information indicative of a strain on the mast with respect to the remainder of the AMD 104. For example, the mast strain sensor 326 may comprise a strain gauge or load cell that measures a side-load applied to the mast or a weight on the mast or downward pressure on the mast. The safety module 216 may utilize sensor data 126 obtained by the mast strain sensor 326. For example, if the strain applied to the mast exceeds a threshold amount, the safety module 216 may direct an audible and visible alarm to be presented by the AMD 104.

The AMD 104 may include a modular payload bay. A payload weight sensor 328 provides information indicative of the weight associated with the modular payload bay. The payload weight sensor 328 may comprise one or more sensing mechanisms to determine the weight of a load. These sensing mechanisms may include piezoresistive devices, piezoelectric devices, capacitive devices, electromagnetic devices, optical devices, potentiometric devices, microelectromechanical devices, and so forth. The sensing mechanisms may operate as transducers that generate one or more signals based on an applied force, such as that of the load due to gravity. For example, the payload weight sensor 328 may comprise a load cell having a strain gauge and a structural member that deforms slightly when weight is applied. By measuring a change in the electrical characteristic of the strain gauge, such as capacitance or resistance, the weight may be determined. In another example, the payload weight sensor 328 may comprise a force sensing resistor (FSR). The FSR may comprise a resilient material that changes one or more electrical characteristics when compressed. For example, the electrical resistance of a particular portion of the FSR may decrease as the particular portion is compressed. In some implementations, the safety module 216 may utilize the payload weight sensor 328 to determine if the modular payload bay has been overloaded. If so, an alert or notification may be issued.

One or more device temperature sensors 330 may be utilized by the AMD 104. The device temperature sensors 330 provide temperature data of one or more components within the AMD 104. For example, a device temperature sensor 330 may indicate a temperature of one or more the batteries 114, one or more motors 116, and so forth. In the event the temperature exceeds a threshold value, the component associated with that device temperature sensor 330 may be shut down.

One or more interlock sensors 332 may provide data to the safety module 216 or other circuitry that prevents the AMD 104 from operating in an unsafe condition. For example, the interlock sensors 332 may comprise switches that indicate whether an access panel is open. The interlock sensors 332 may be configured to inhibit operation of the AMD 104 until the interlock switch indicates a safe condition is present.

A gyroscope 334 may provide information indicative of rotation of an object affixed thereto. For example, a gyroscope 334 may generate sensor data 126 that is indicative of a change in orientation of the AMD 104 or a portion thereof.

An accelerometer 336 provides information indicative of a direction and magnitude of an imposed acceleration. Data such as rate of change, determination of changes in direction, speed, and so forth may be determined using the accelerometer 336. The accelerometer 336 may comprise mechanical, optical, micro-electromechanical, or other devices. For example, the gyroscope 334 in the accelerometer 336 may comprise a prepackaged solid-state inertial measurement unit (IMU) that provides multiple axis gyroscopes 334 and accelerometers 336.

A magnetometer 338 may be used to determine an orientation by measuring ambient magnetic fields, such as the terrestrial magnetic field. For example, the magnetometer 338 may comprise a Hall effect transistor that provides output compass data indicative of a magnetic heading.

The AMD 104 may include one or more location sensors 340. The location sensors 340 may comprise an optical, radio, or other navigational system such as a global positioning system (GPS) receiver. For indoor operation, the location sensors 340 may comprise indoor position systems, such as using Wi-Fi Positioning Systems (WPS). The location sensors 340 may provide information indicative of a relative location, such as "living room" or an absolute location such as particular coordinates indicative of latitude and longitude, or displacement with respect to a predefined origin.

A photodetector 342 provides sensor data 126 indicative of impinging light. For example, the photodetector 342 may provide data indicative of a color, intensity, duration, and so forth.

A camera 344 generates sensor data 126 indicative of one or more images. The camera 344 may be configured to detect light in one or more wavelengths including, but not limited to, terahertz, infrared, visible, ultraviolet, and so forth. For example, an infrared camera 344 may be sensitive to wavelengths between approximately 700 nanometers and 1 millimeter. The camera 344 may comprise charge coupled devices (CCD), complementary metal oxide semiconductor (CMOS) devices, microbolometers, and so forth. The AMD 104 may use image data acquired by the camera 344 for object recognition, navigation, collision avoidance, user communication, and so forth. For example, a pair of cameras 344 sensitive to infrared light may be mounted on the front of the AMD 104 to provide binocular stereo vision, with the sensor data 126 comprising images being sent to the autonomous navigation module 146. In another example, the camera 344 may comprise a 10 megapixel or greater camera that is used for videoconferencing or for acquiring pictures for the user.

The camera 344 may include a global shutter or a rolling shutter. The shutter may be mechanical or electronic. A mechanical shutter uses a physical device such as a shutter vane or liquid crystal to prevent light from reaching a light sensor. In comparison, an electronic shutter comprises a specific technique of how the light sensor is read out, such as progressive rows, interlaced rows, and so forth. With a rolling shutter, not all pixels are exposed at the same time. For example, with an electronic rolling shutter, rows of the light sensor may be read progressively, such that the first row on the sensor was taken at a first time while the last row was taken at a later time. As a result, a rolling shutter may produce various image artifacts, especially with regard to images in which objects are moving. In contrast, with a global shutter the light sensor is exposed all at a single time, and subsequently read out. In some implementations, the camera(s) 344, particularly those associated with navigation or autonomous operation, may utilize a global shutter. In other implementations, the camera(s) 344 providing images for use by the autonomous navigation module 146 may be acquired using a rolling shutter and subsequently may be processed to mitigate image artifacts.

One or more microphones 346 may be configured to acquire information indicative of sound present in the physical space 102. In some implementations, arrays of microphones 346 may be used. These arrays may implement beamforming techniques to provide for directionality of gain. The AMD 104 may use the one or more microphones 346 to acquire information from acoustic tags, accept voice input from users 112, determine a direction of an utterance, determine ambient noise levels, for voice communication with another user or system, and so forth.

An air pressure sensor 348 may provide information indicative of an ambient atmospheric pressure or changes in ambient atmospheric pressure. For example, the air pressure sensor 348 may provide information indicative of changes in air pressure due to opening and closing of doors, weather events, and so forth.

An air quality sensor 350 may provide information indicative of one or more attributes of the ambient atmosphere. For example, the air quality sensor 350 may include one or more chemical sensing elements to detect the presence of carbon monoxide, carbon dioxide, ozone, and so forth. In another example, the air quality sensor 350 may comprise one or more elements to detect particulate matter in the air, such as the photoelectric detector, ionization chamber, and so forth. In another example, the air quality sensor 350 may include a hygrometer that provides information indicative of relative humidity.

An ambient light sensor 352 may comprise one or more photodetectors or other light-sensitive elements that are used to determine one or more of the color, intensity, or duration of ambient lighting around the AMD 104.

An ambient temperature sensor 354 provides information indicative of the temperature of the ambient physical space 102 proximate to the AMD 104. In some implementations, an infrared temperature sensor may be utilized to determine the temperature of another object at a distance.

A floor analysis sensor 356 may include one or more components that are used to generate at least a portion of the floor characterization data. In one implementation, the floor analysis sensor 356 may comprise circuitry that may be used to determine one or more of the electrical resistance, electrical inductance, or electrical capacitance of the floor. For example, two or more of the wheels in contact with the floor may include an allegedly conductive pathway between the circuitry and the floor. By using two or more of these wheels, the circuitry may measure one or more of the electrical properties of the floor. Information obtained by the floor analysis sensor 356 may be used by one or more of the safety module 216, the autonomous navigation module 146, the task module 148, and so forth. For example, if the floor analysis sensor 356 determines that the floor is wet, the safety module 216 may decrease the speed of the AMD 104 and generate a notification alerting the user.

The floor analysis sensor 356 may include other components as well. For example, a coefficient of friction sensor may comprise a probe that comes into contact with the surface and determines the coefficient of friction between the probe and the floor.

A caster rotation sensor 358 provides data indicative of one or more of a direction of orientation, angular velocity, linear speed of the caster, and so forth. For example, the caster rotation sensor 358 may comprise an optical encoder and corresponding target that is able to determine that the caster transitioned from an angle of 0° at a first time to 49° at a second time.

The sensors 124 may include a radar 360. The radar 360 may be used to provide information as to a distance, lateral position, and so forth, to an object.

The sensors 124 may include a passive infrared (PIR) sensor 362. The PIR 362 sensor may be used to detect the presence of users 112, pets, hotspots, and so forth. For example, the PIR sensor 362 may be configured to detect infrared radiation with wavelengths between 8 and 14 micrometers.

The AMD 104 may include other sensors 364 as well. For example, a capacitive proximity sensor may be used to provide proximity data to adjacent objects. Other sensors 364 may include radio frequency identification (RFID) readers, near field communication (NFC) systems, coded aperture cameras, and so forth. For example, NFC tags may be placed at various points within the physical space 102 to provide landmarks for the autonomous navigation module 146. One or more touch sensors may be utilized to determine contact with a user or other objects.

The AMD 104 may include one or more output devices 150. A motor 116 may be used to provide linear or rotary motion. A light 382 may be used to emit photons. A speaker 384 may be used to emit sound. A display 386 may comprise one or more of a liquid crystal display, light emitting diode display, electrophoretic display, cholesteric liquid crystal display, interferometric display, and so forth. The display 386 may be used to present visible information such as graphics, pictures, text, and so forth. In some implementations, the display 386 may comprise a touchscreen that combines a touch sensor and a display 386.

In some implementations, the AMD 104 may be equipped with a projector 388. The projector 388 may be able to project an image on a surface, such as the floor, wall, ceiling, and so forth.

A scent dispenser 390 may be used to emit one or more smells. For example, the scent dispenser 390 may comprise a plurality of different scented liquids that may be evaporated or vaporized in a controlled fashion to release predetermined amounts of each.

One or more moveable component actuators 392 may comprise an electrically operated mechanism such as one or more of a motor, solenoid, piezoelectric material, electroactive polymer, shape-memory alloy, and so forth. The actuator controller may be used to provide a signal or other input that operates one or more of the moveable component actuators 392 to produce movement of the moveable component.

In other implementations, other 394 output devices may be utilized. For example, the AMD 104 may include a haptic output device that provides output that produces particular touch sensations to the user. Continuing the example, a motor 116 with an eccentric weight may be used to create a buzz or vibration to allow the AMD 104 to simulate the purr of a cat.

FIG. 4 illustrates variable region data 138 used to generate a navigation map 144 for autonomous navigation, according to some implementations. The maps used in the system 100 may comprise cells in a specified arrangement. For example, the specified arrangement may comprise a grid or two-dimensional array of cells arranged in rows and columns. Each cell is associated with a particular area within the physical space 102. In other implementations other techniques may be used to designate areas within the physical space 102.

An region identifier 402 may represent a particular variable region 140. The variable region 140 represents a particular area in the physical space 112. In this illustration, region corners 404 are specified that indicate coordinates along two orthogonal axes of corners of rectangular variable regions 140. For example, an region identifier 402(1) has a first corner at coordinates (129,303) and a second corner at coordinates (139,323). Rectangular variable regions 140 are described for ease of illustration and not necessarily as a limitation. For example, variable regions 140 may be described as other polygons, irregular shapes, sequences of cells, and so forth.

An region tag 406 provides information indicative of the nature of the variable region 140. For example, the region tag 406 may designate that the variable region 140 is a particular door.

A last observed state 408 may be stored, indicating whether the variable region 140 was last observed by sensor data 126 as being closed (occupied by an obstacle 110) or open (unoccupied by an obstacle 110). In some implementations the last observed state 408 may be based on input data 128. For example, the user may provide input data 128 that indicates the hall/kitchen door is open.

The variable region data 138 may include other information, such as statistics associated with attempted traversal of the variable region 140. For example, a count of successful traversals of this region 410 may indicate the count of times the AMD 104 attempted to follow a path 108 that went through the variable region 140 and succeeded. If the AMD 104 was able to move from one side of the variable region 140 to the other, the traversal may be deemed successful and the count incremented. Similarly, a count of failed traversals of this region 412 may indicate the count of times the AMD 104 attempted to follow a path 108 that went through the variable region 140 and failed. If the AMD 104 was unable to move from one side of the variable region 140 to the other, the traversal may be deemed failed and this count may be incremented. In other implementations, other information may be determined. For example, a failure rate may be determined using the count of successful traversals 410 and count of failed traversals 412. Continuing the example, the failure rate may comprise the count of failed traversals 412 divided by a sum of the count of successful traversals 410 and the count of failed traversals 412.

Other information may also be associated with a variable region 140. For example, a timestamp indicative of when the region was created, added, last observed as having had a change in state, and so forth may be stored. Entries in the variable region data 138 may expire after a certain time. For example, after an elapsed time since first determination of the variable region 140, the variable region 140 may be removed from the variable region data 138. In some implementations visitation data 132 may also expire. For example, information about areas in the physical space 102 that the AMD 104 has not visited in the last 30 days may be removed from the visitation data 132.

The autonomous navigation module 146 may use information such as the last observed state 408, elapsed time since last observation of the variable region 140, count of successful traversals 410, and count of failed traversals 412, for path planning. This information may be used as inputs to the path planning algorithm, such as Theta*, to determine a path cost for a particular path 108. The following implementations may be used individually or in combination with one another for path planning.

In a first implementation the path 108 which has the fewest number of variable regions 140 may be selected. For example, the count of variable regions 140 along a path 108 may be used to increase a path cost for that path 108. In this implementation, all other factors being equal, the path 108 which traverses the fewest variable regions 140 would be selected.

In a second implementation the count of failed traversals 412 indicating how many times traversal of the variable region 140 failed may be used to determine a path cost. For example, for a first variable region 140, a first count indicative of how many times traversal of the first variable region 140 failed 412 may be determined. Based at least in part on the first count, a first path cost for a first path that traverses the first variable region 140 is determined. A second count may be determined that is indicative of how many times traversal of a second variable region 140 failed 412, wherein the second count is greater than the first count. Based at least in part on the second count, a second path cost associated with a second path 108 is determined. The second path cost is determined to be greater than the first path cost, and so the first path may be selected for use. In this implementation, all other factors being equal, the path 108 which traverses the variable region 140 with the lowest count of failures 412 to traverse would be selected.

In a third implementation a failure rate associated with a particular variable region 140 may be determined and used for path planning. For example, a first count of a number of successful traversals 410 of the first variable region 140 is determined. A second count of a number of failed attempts to traverse the first area 412 is determined. A failure rate is determined based on the first count and the second count. The failure rate may be used to calculate a path cost, which may then be used to determine the path 108 to use. In this implementation, all other factors being equal, the path 108 which traverses a variable region 140 with a lower failure rate would be selected.

In another implementation, if a ratio of failed traversals to successful traversals is greater than a threshold value, the particular variable region 140 may be designated as impassible and removed from the variable region data 138, with the occupancy map 134 indicating that the region is a static obstacle 110.

Figure 5:
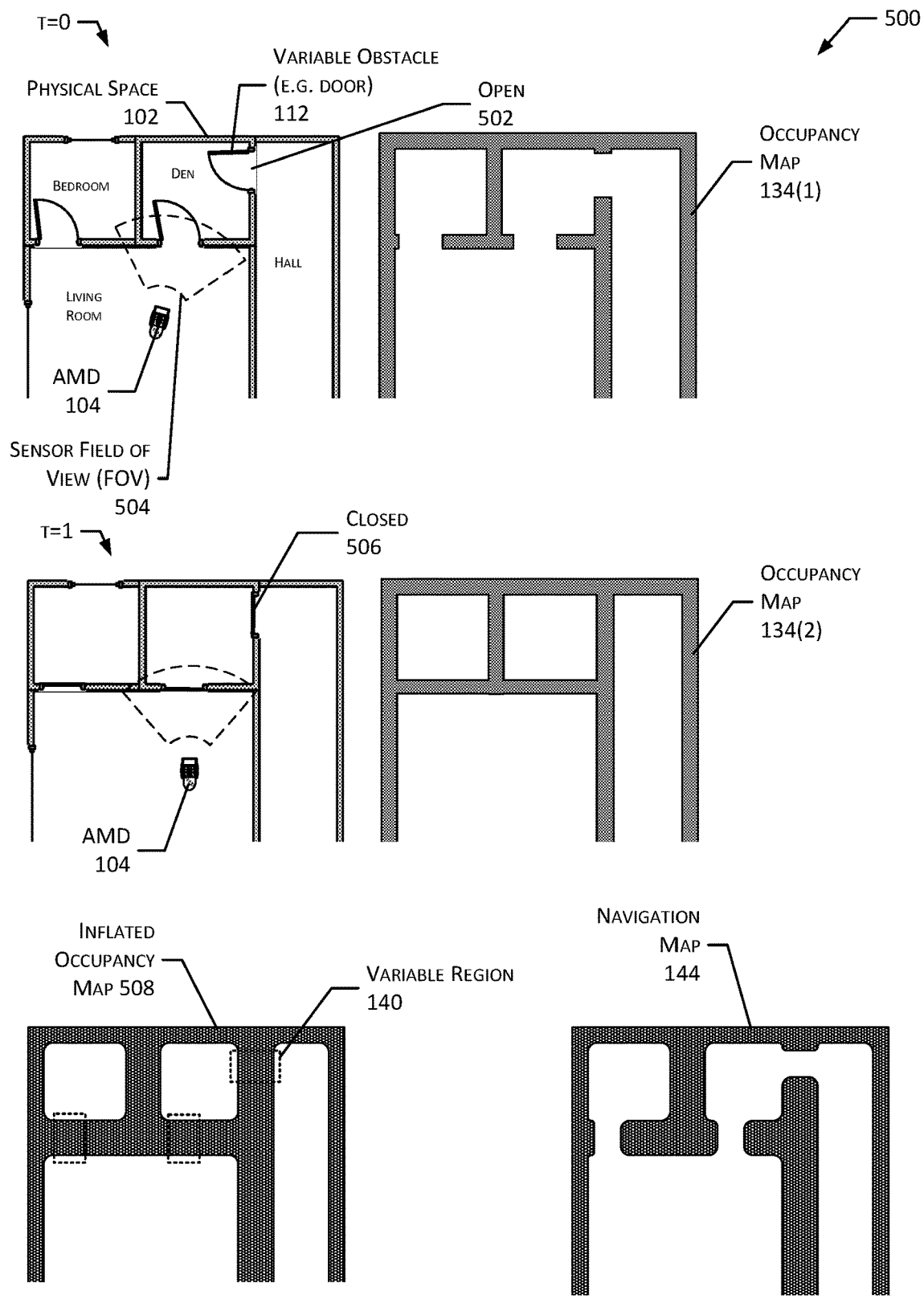
FIG. 5 illustrates several examples of physical space, corresponding occupancy map, inflated occupancy map, variable regions, and resulting navigation map, according to some implementations.

FIG. 5 illustrates several examples of the physical space 102, corresponding occupancy maps 134, an inflated occupancy map 508, and resulting navigation map 144.

At time t=0 a portion of the physical space 102 is depicted in which three doors (living room/bedroom, living room/den, and den/hall) are open 502. In this open 502 state, the doors do not obstruct passage of the AMD 104. The sensors 124 on the AMD 104 have a sensor field of view (FOV) 504 that includes the door between the living room and the den.

An occupancy map 134(1) as of time t=0 is also shown. The occupancy map 134(1) depicts obstacles 110 such as the walls corresponding to the sensor data 126 obtained from the sensors 124 up to time t=0.

At time t=1 the portion of the physical space 102 is again depicted, but the three doors are closed 506. In this closed 506 state, the doors obstruct passage of the AMD 104, preventing passage through the doors 112. A corresponding occupancy map 134(2) as of time t=1 shows these obstacles 110, with no opening depicted in the areas corresponding to the doors 112. In some implementations, the difference in time from the first time t=0 to the second time t=1 may be greater than a minimum time threshold. For example, the minimum time threshold may be at least 60 seconds.

As described above, an inflated occupancy map 508 of the most recent occupancy map 134(2) associated with time t=1 may be determined. The variable regions 140 corresponding to the doors are shown in the inflated occupancy map 508. To determine the navigation map 144, the inflated occupancy map 508 may then be modified using the variable region data 138 to indicate that the areas associated with the variable regions 140 are traversable.

The navigation map 144 may then be used by the autonomous navigation module 146 to determine path plan data 232 representative of a path 108 through the physical space 102.

Figure 6:
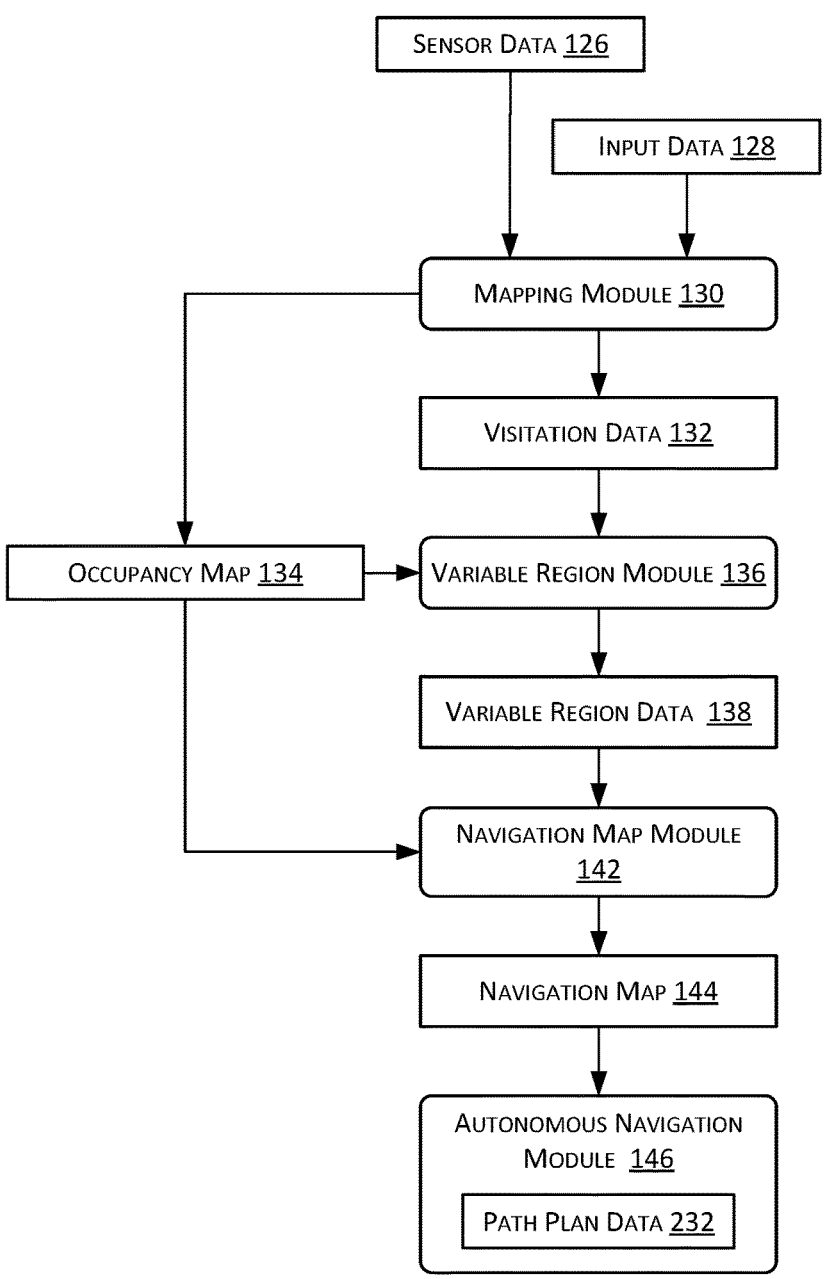
FIG. 6 is system for using variable region data for autonomous navigation, according to some implementations.

FIG. 6 is system 600 for using variable region data 138 for autonomous navigation, according to some implementations.

Data such as one or more of the sensor data 126 acquired by the sensors 124, the input data 128, and so forth are provided to the mapping module 130 which determines the occupancy map 134 and the visitation data 132. The mapping module 130 may be configured to omit from the occupancy map 134 dynamic objects, such as people, pets, other AMDs 104, and so forth.

The variable region module 136 may use the occupancy map 134 and the visitation data 132 to determine the variable region data 138. A variable region 140 may comprise an area in the physical space 102 for which the occupancy map 134 indicates an obstacle 110 is present and the AMD 104 has previously occupied. For example, the variable region module 136 may use the visitation data 132 and the occupancy map 134 to determine a region in the physical space 102 where the occupancy map 134 indicates the presence of an obstacle 110, such as a cell with an obstacle value of "occupied", and the visitation data 132 indicates that the region or a portion thereof was previously visited by the AMD 104.

In other implementations, other techniques may be used. In a first implementation a comparison of two occupancy maps 132 describing the physical space 102 at different times may be made, and a same cell that differs in obstacle value may be designated as a variable region. For example, as shown in FIG. 5 changes between the occupancy map 134(1) and 132(2) may be designated as variable regions 140. In some implementations the variable region module 136 may determine if the region of a proposed variable region 140 has a size greater than a threshold value. If not, the proposed variable region 140 may be disregarded. If the size is greater than the threshold value, then the proposed variable region 140 may be indicated in the variable region data 138. For example, the threshold value may specify a minimum size of five cells for a proposed variable region 140 to be added to the variable region data 138.

In yet another implementation, the variable region module 136 may use a machine learning system, such as a neural network, to process the sensor data 126 and determine the presence of a variable obstacle 112, such as a door or gate for inclusion in the variable region data 138. For example, an image from a camera 344 on the AMD 104 may be used to obtain an image of a portion of a room. That image may be processed to determine the presence and location of a door. This information may then be used to designate the variable region data 138 indicative of the door.

In a third implementation, the variable region module 136 may process the sensor data 126 and consider one or more characteristics such as velocity, trajectory, maximum distance moved, and so forth to determine the variable region data 138. A variable obstacle may be designated as having, when in motion, a maximum velocity that is below a threshold value. A variable obstacle may be designated as exhibiting a particular trajectory, or not exhibiting a particular trajectory. For example, a hinged door is expected to move with a first edge relatively fixed at the hinge point while a second edge moves through an arc centered on the first edge. Observation of such a motion may be indicative of a variable obstacle. Likewise, a variable obstacle may be considered to be an object that only moves no more than a maximum distance. For example, a pocket door or sliding door may move along a straight linear track, but only moves 1 meter left and right.

In a fourth implementation, input data 128 from a source such as a user may be used to designate a variable region 140 and determine the variable region data 138. For example, while providing a tour to the AMD 104, the user may point to the door and say aloud "this is a door" which may then be processed and used to generate the region tag 406, provide information about the type of variable region 140, and so forth. In another example the input data 128 may be indicative of user input, such as input to a map of the physical space 102 presented on a screen, to designate that a region is subject to change between being occupied (traversable) and being unoccupied (impassible).

The navigation map module 142 determines the navigation map 144 using the occupancy map 134 and the variable region data 138. In one implementation, the navigation map module 142 may inflate the occupancy map 134 to determine an inflated occupancy map 508. The areas in the inflated occupancy map 508 corresponding to the variable regions 140 indicated in the variable region data 138 may be set to being unoccupied by obstacles 110, resulting in the navigation map 144. In other implementations other techniques may be used to determine the navigation map 144 based at least in part on the variable region data 138.

The navigation map 144 may be provided to an autonomous navigation module 146. The autonomous navigation module 146 may use the navigation map 144 to determine path plan data 232 indicative of a path 108 from a first location 106(1) to a second location 106(2).

FIG. 7 is a flow diagram 700 of a process for using variable region data 138 for autonomous navigation, according to some implementations. The process may be implemented at least in part by one or more of the AMD 104, the docking station 154, a server 156, or other device 158.

At 702 an occupancy map 134 is determined. For example, the occupancy map 134 indicative of the physical environment 102 may be determined from the sensor data 126.

At 704 visitation data 132 indicative of areas in the physical space 102 that the AMD 104 has previously occupied is determined. For example, the visitation data 132 may be based on a trajectory "T" as provided by the mapping module 130 and take into account a footprint of the AMD 104. In some implementations the visitation data 132 may comprise an overlay or additional data with respect to the occupancy map 134.

At 706 variable region data 138 indicative of a region in the physical space 102 is determined for which the occupancy map 134 indicates an obstacle is present and the visitation data 132 indicates the AMD 104 has previously visited. For example, the variable region 140 may comprise a set of cells for which the occupancy map 134 indicates an occupancy value of "occupied" and the visitation data 132 indicates that the same cell was previously occupied by the AMD 104 at some previous time.

At 708, a navigation map 144 is determined based on the occupancy map 134 and the variable region data 138. For example, the occupancy map 134 may be inflated to determine an inflated occupancy map 508. The portions of the inflated occupancy map 508 that are associated with the variable regions 140 may then be designated in the navigation map 144 as being unoccupied or otherwise available for traversal.

At 710 a first path 108 is determined from a first location 106(1) to a second location 106(2), based at least in part on the navigation map 144. For example, the autonomous navigation module 146 may use the navigation map 144 to determine the path plan data 232.

At 712 an AMD 104 is moved along at least a portion of the first path 108. For example, the AMD 104 may move along the path 108 specified by the path plan data 232. This path 108 may include traversal of one or more variable regions 140. In the event that a particular variable region 140 is impassible, such as if a door has been left closed, the autonomous navigation module 146 may determine a second path 108 to the second location 106(2), if possible.

The processes and methods discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage medium may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, physical spaces, and situations. Although the subject matter has been described in language specific to structural features or methodological acts, it is to be understood that the subject matter defined in the appended claims is not necessarily limited to the specific features or acts described. Rather, the specific features and acts are disclosed as illustrative forms of implementing the claims.

What is claimed is:

1. A robot comprising:
one or more sensors;
one or more motors coupled to one or more wheels;
one or more memories storing first computer-executable instructions; and
one or more processors to execute the first computer-executable instructions to:
acquire sensor data from the one or more sensors;
determine, at a first time, an occupancy map comprising a first plurality of cells,
wherein each cell in the first plurality of cells is associated with an area in a physical space;
determine visitation data indicative of cells in the occupancy map that are associated with areas in the physical space that the robot has previously occupied at one or more times before the first time;
determine a first set of cells, wherein each cell in the first set of cells is associated with a respective area in the physical space that:
the occupancy map indicates includes an obstacle at the first time, and
the visitation data indicates that the robot has previously occupied at the one or more times before the first time;
determine a navigation map based on the occupancy map and the first set of cells, wherein the robot is allowed to traverse through the respective areas associated with the first set of cells;
determine, using the navigation map, a first path from a first location to a second location in the physical space, the first path including at least one or more of the respective areas; and
move the robot along the first path at a second time.

2. The robot of claim 1, the one or more processors to further execute the first computer-executable instructions to:
determine, at a third time, that a first respective area contains an obstacle and is impassible;
determine a current location of the robot at the third time;
determine, using the navigation map, a second path from the current location to the second location, wherein the second path avoids the first respective area; and
move the robot along the second path.

3. A method performed at least in part by an autonomous mobile device (AMD), the method comprising:
determining, at a first time, an occupancy map comprising a first plurality of cells, wherein each cell in the first plurality of cells is associated with an area in a physical space;
determining a first set of cells, wherein each cell in the first set of cells is associated with an area in the physical space that the AMD has previously occupied at one or more times before the first time;
determining, based on the occupancy map and the first set of cells, a second set of cells indicative of a first region in the physical space that:
the occupancy map indicates includes an obstacle at the first time, and
the AMD has previously occupied at the one or more times before the first time;
determining, based on the occupancy map and the second set of cells, a first path from a first location in the physical space to a second location in the physical space, the first path traversing the first region; and moving the AMD along at least a portion of the first path.

4. The method of claim 3, further comprising:
determining a footprint of the AMD; and
wherein the area in the physical space that the AMD has previously occupied includes the footprint.

5. The method of claim 3, the determining the first path comprising:
determining a first distance;
determining that a first cell of the occupancy map has a first obstacle value;
determining, based on the occupancy map, a third set of cells that are within the first distance of the first cell, wherein each cell in the third set of cells is associated with a second area in the physical space;
setting an obstacle value for each cell in the third set of cells to a first value, the first value being indicative of the second area being occupied by an obstacle; and
setting the obstacle value for each cell in the second set of cells to a third value, the third value indicative of traversal by the AMD being permitted in the area.

6. The method of claim 3, further comprising:
determining a first count indicative of a number of times that the AMD was unable to traverse the first region; and
wherein the determining the first path is based at least in part on the first count.

7. The method of claim 3, the determining the first path further comprising:
determining a first count indicative of a number of times that the AMD was unable to traverse the first region;
determining, based at least in part on the first count, a first path cost associated with the first path;
determining a second count indicative of a number of times that the AMD was unable to traverse a second region, wherein the second count is greater than the first count;
determining, based at least in part on the second count, a second path cost associated with a second path; and
determining the second path cost is greater than the first path cost.

8. The method of claim 3, the determining the first path further comprising:
determining a first count of a number of successful traversals by the AMD of the area;
determining a second count of a number of unsuccessful attempts by the AMD to traverse the area;
determining, based on the first count and the second count, a failure rate; and
wherein the determining the first path is based at least in part on the failure rate.

9. The method of claim 3, further comprising:
determining a plurality of regions in the physical space that the occupancy map indicates contain an obstacle at the first time and the AMD has previously occupied at the one or more times before the first time;
determining, for the first path, a count of the plurality of regions the first path traverses; and
wherein the determining the first path is based at least in part on the count.

10. An autonomous mobile device (AMD) comprising:
one or more sensors;
one or more motors;
one or more memories storing first computer-executable instructions; and
one or more processors to execute the first computer-executable instructions to:

determine, at a first time, an occupancy map representative of a physical space;
determine first data indicative of areas in the physical space that the AMD has previously visited at one or more times before the first time;
determine a first region in the physical space that the occupancy map indicates contains an obstacle at the first time and the first data indicates the AMD has previously visited at the one or more times before the first time;
determine a navigation map based on the occupancy map and the first region,
wherein traversal of the first region by the AMD is permitted; and
move the AMD based on the navigation map.

11. The AMD of claim 10, the one or more processors to further execute the first computer-executable instructions to:
determine a footprint of the AMD; and
wherein the first data indicative of the areas in the physical space that the AMD has previously visited includes the footprint.

12. The AMD of claim 10, the one or more processors to further execute the first computer-executable instructions to:
acquire a first image of the first region using the one or more sensors; and
process the first image using object recognition to determine the first image depicts one or more of a door or a doorway.

13. The AMD of claim 10, the first computer-executable instructions to determine the first region further comprising instructions to:
determine input data indicative of user input, wherein the input data designates the first region as traversable.

14. The AMD of claim 10, the one or more processors to further execute the first computer-executable instructions to:
determine the first region at a second time;
determine an elapsed time since the second time exceeds a threshold value; and
determine a second navigation map, wherein the first region is designated as being occupied by an obstacle in the physical space.

15. The AMD of claim 10, the one or more processors to further execute the first computer-executable instructions to:
determine a size of the first region is equal to or greater than a first threshold.

16. The AMD of claim 10, the first computer-executable instructions to determine the navigation map further comprising instructions to:
determine a first distance;
determine a first cell in the occupancy map has a first obstacle value;
determine, based on the occupancy map, a first set of cells that are within the first distance of the first cell;
set an obstacle value for each cell in the first set of cells to a first value, the first value being indicative of an area associated with the cell in the physical space being occupied by an obstacle; and
set the obstacle value for each cell in the first set of cells that are within the first region to a second value indicative of the area associated with the cell in the physical space being traversable.

17. The AMD of claim 10, the one or more processors to further execute the first computer-executable instructions to:
determine a first count indicative of a number of times that the AMD failed to traverse the first region; and determine a first path from a first location to a second location based at least in part on the navigation map and the first count.

18. The AMD of claim 10, the one or more processors to further execute the first computer-executable instructions to:
   determine a first count indicative of a number of successful traversals of the first region by the AMD;
   determine a second count indicative of a number of unsuccessful attempts by the AMD to move through the first region;
   determine a failure rate based on the first count and the second count; and
   determine a first path from a first location to a second location based at least in part on the navigation map and the failure rate.

19. The AMD of claim 10, the one or more processors to further execute the first computer-executable instructions to:
   determine a plurality of regions in the physical space that the occupancy map indicates contain an obstacle at the first time and the AMD has previously visited at the one or more times before the first time;
   determine second data based on one or more of traversals or attempted traversals of one or more regions in the plurality of regions; and
   determine a first path from a first location to a second location based at least in part on the navigation map and the second data.

20. The AMD of claim 10, the one or more processors to further execute the first computer-executable instructions to:
   determine, based on the navigation map, a first path from a first location in the physical space to a second location in the physical space, the first path traversing the first region;
   determine, based on sensor data from the one or more sensors, occupancy data that the first region contains an obstacle at a second time; and
   determine a second navigation map based on the occupancy map and the occupancy data, wherein traversal of the first region by the AMD is prohibited due to presence of an obstacle at the second time.

\* \* \* \* \*